United States Patent
Wolnowski

(10) Patent No.: US 11,670,932 B2
(45) Date of Patent: Jun. 6, 2023

(54) SHORT CIRCUIT ISOLATOR

(71) Applicant: Carrier Corporation, Palm Beach Gardens, FL (US)

(72) Inventor: Piotr Wolnowski, Gdańsk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 67 days.

(21) Appl. No.: 17/126,368

(22) Filed: Dec. 18, 2020

(65) Prior Publication Data

US 2021/0367417 A1 Nov. 25, 2021

(30) Foreign Application Priority Data

May 21, 2020 (EP) .................................... 20175921

(51) Int. Cl.
*H02H 1/00* (2006.01)
*H02H 3/08* (2006.01)

(52) U.S. Cl.
CPC ............ *H02H 1/0007* (2013.01); *H02H 3/08* (2013.01)

(58) Field of Classification Search
CPC ........ G01R 31/52; G08B 17/06; G08B 25/04; G08B 29/04; G08B 29/043; G08B 29/06; G08B 29/123; H02H 1/0007; H02H 3/08; H02H 3/24; H02H 7/20; H02H 7/268
See application file for complete search history.

(56) References Cited

U.S. PATENT DOCUMENTS

| | | | |
|---|---|---|---|
| 4,037,220 A * | 7/1977 | Beyersdorf | G08B 29/06 340/652 |
| 4,528,610 A * | 7/1985 | Payne | G08B 26/005 340/505 |
| 4,752,698 A | 6/1988 | Furuyama et al. | |
| 5,097,259 A | 3/1992 | Testa et al. | |
| 5,631,795 A * | 5/1997 | Koyama | H02H 3/042 340/650 |
| 5,801,913 A | 9/1998 | Pittel | |
| 6,459,370 B1 | 10/2002 | Barrieau et al. | |
| 6,567,001 B1 | 5/2003 | Barrieau et al. | |
| 6,606,028 B1 | 8/2003 | Tice et al. | |
| 2013/0335139 A1* | 12/2013 | Meah | G08B 29/043 327/581 |

(Continued)

FOREIGN PATENT DOCUMENTS

| | | |
|---|---|---|
| EP | 0101172 B1 | 3/1987 |
| EP | 0581248 A1 | 2/1994 |

(Continued)

OTHER PUBLICATIONS

European Search Report for International Applicaton No. 20175921.4 dated Sep. 25, 2020, 66 pgs.

*Primary Examiner* — Jared Fureman
*Assistant Examiner* — Nicolas Bellido
(74) *Attorney, Agent, or Firm* — Cantor Colburn LLP

(57) ABSTRACT

A method of locating a short circuit in a system including a set of components electrically connected in a loop, such as a fire protection system. It is iteratively determined in which location of a set of possible locations a short circuit is located. Each iteration involves determining in which of two subsets of a set of remaining locations the short circuit is located, and eliminating from the set of remaining locations the subset in which the short circuit is determined not to be located.

9 Claims, 10 Drawing Sheets

(56) References Cited

U.S. PATENT DOCUMENTS

2021/0142649 A1* 5/2021 Cordoba Galera .... G08B 25/04
2021/0192926 A1* 6/2021 Vannebo ................ G08B 25/04
2022/0404433 A1* 12/2022 Moix ..................... G08B 29/06

FOREIGN PATENT DOCUMENTS

| EP | 0697684 B1 | 1/2000 |
|----|------------|--------|
| EP | 1001554 A2 | 5/2000 |
| EP | 2348497 B1 | 7/2013 |
| EP | 2960879 A1 | 12/2015 |
| EP | 3441777 A1 | 8/2017 |
| EP | 2791925 B1 | 8/2018 |
| EP | 2791926 B1 | 1/2019 |
| EP | 2625677 B1 | 3/2019 |
| WO | 2019242863 A1 | 12/2019 |

\* cited by examiner

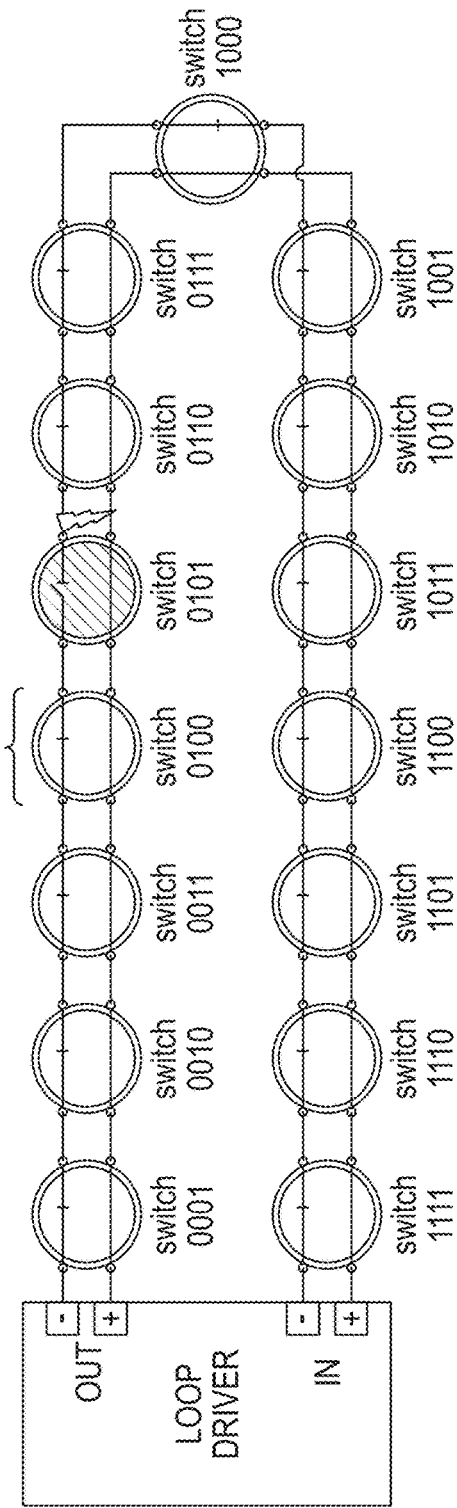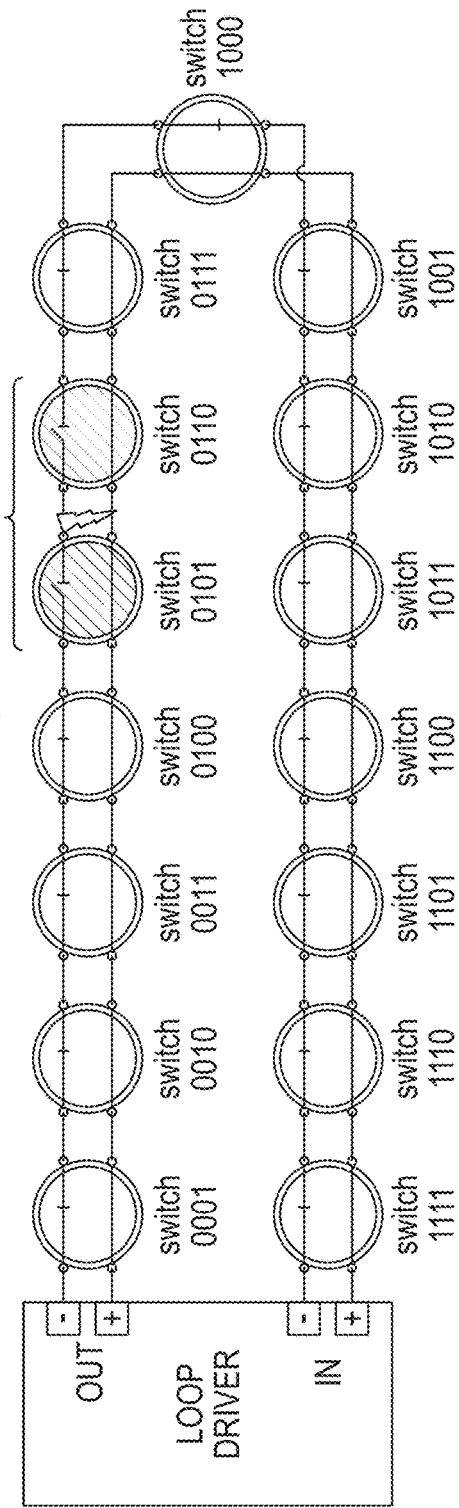

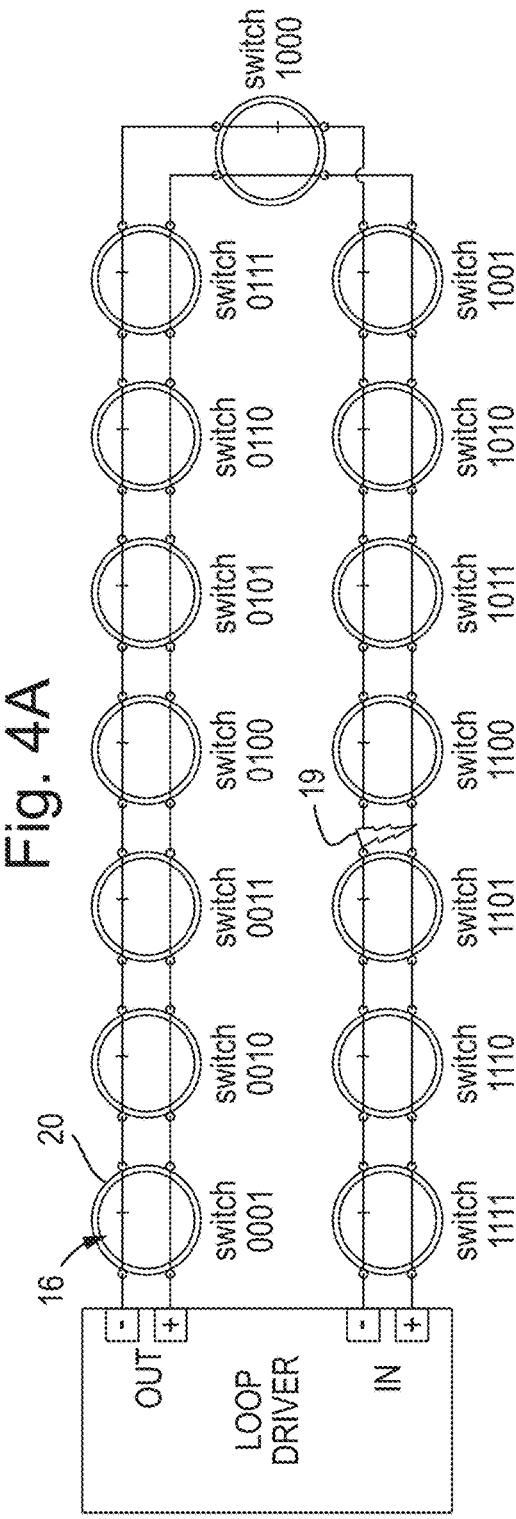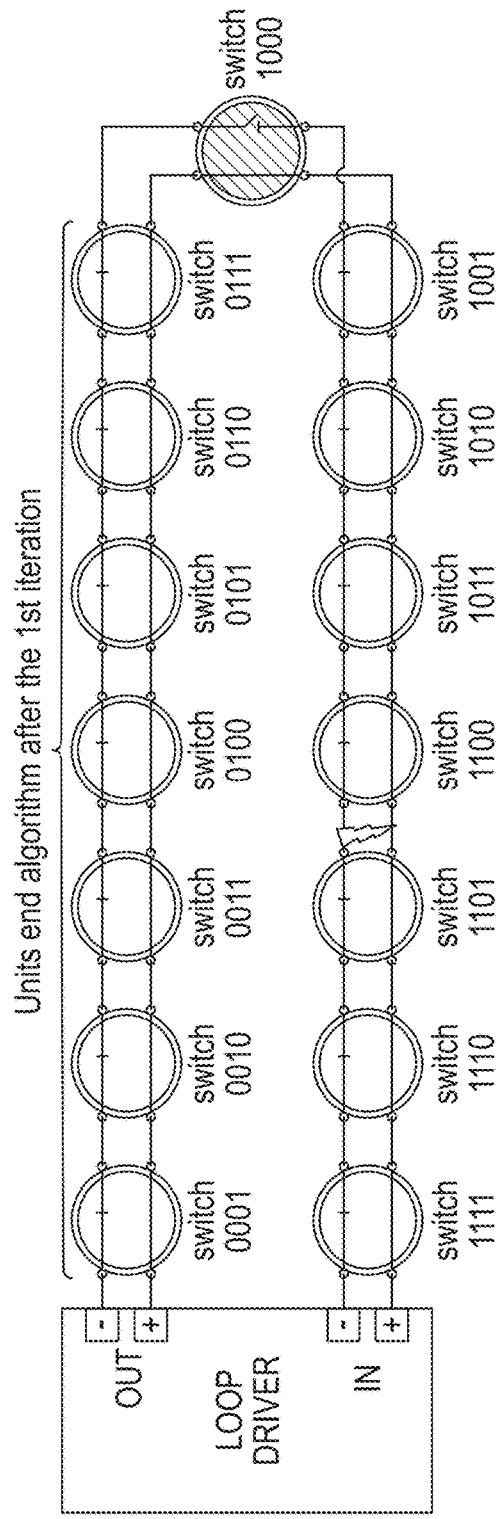

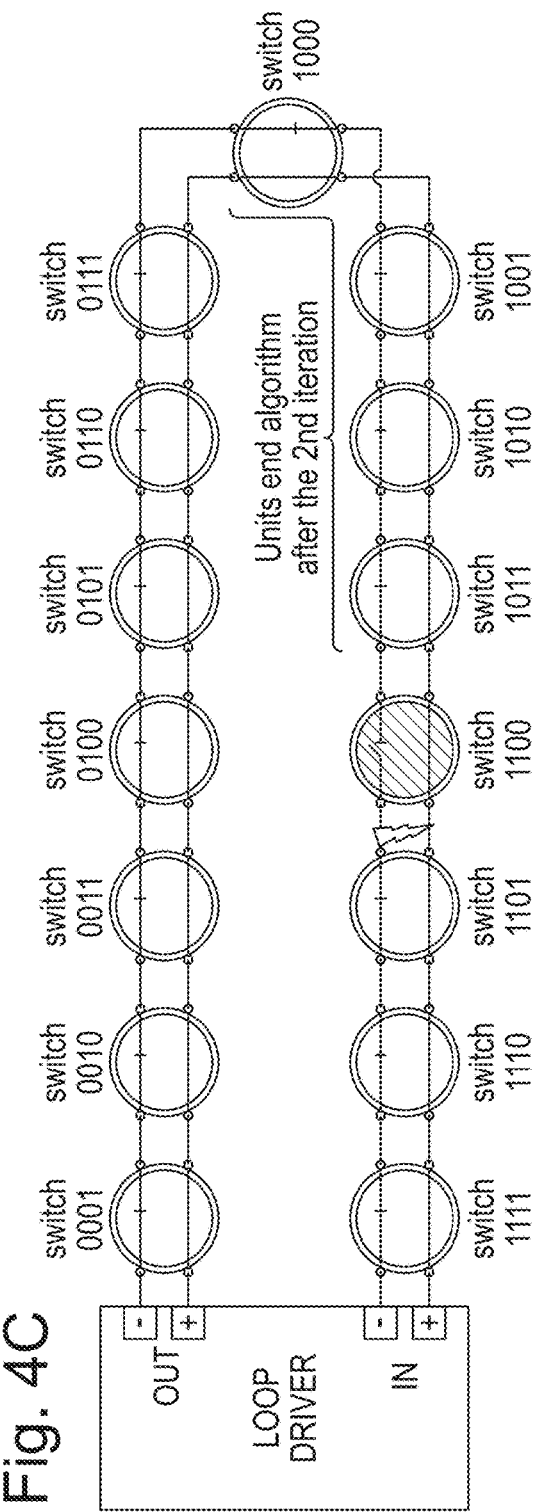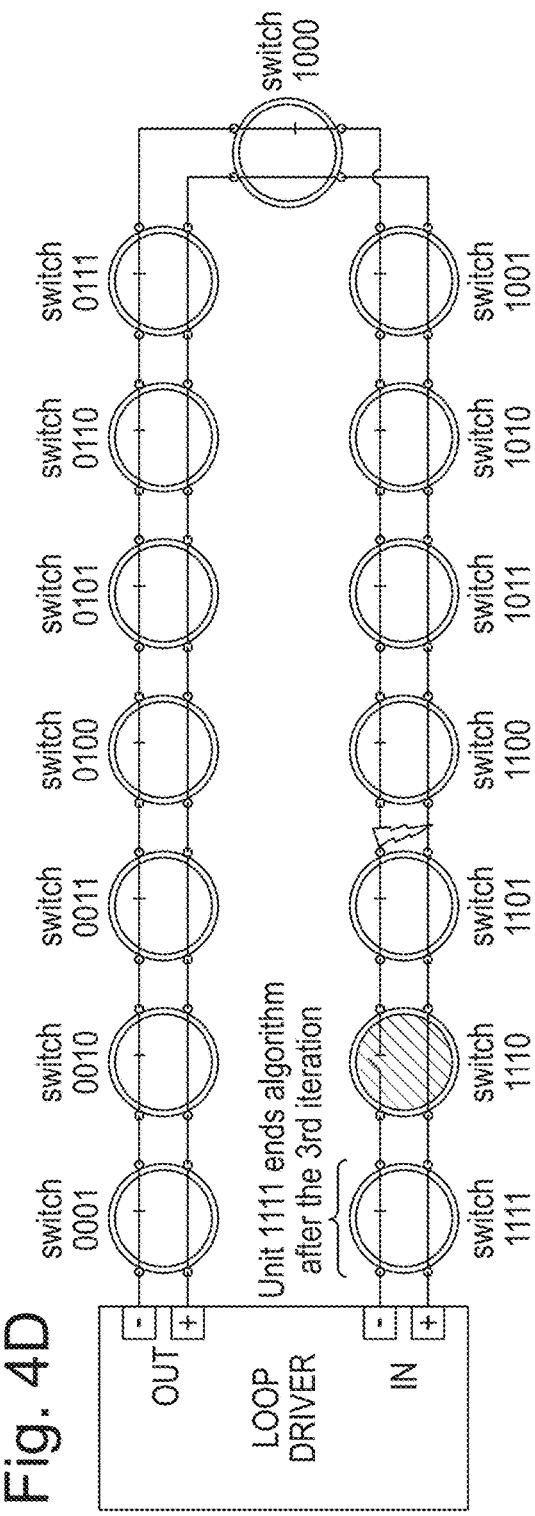

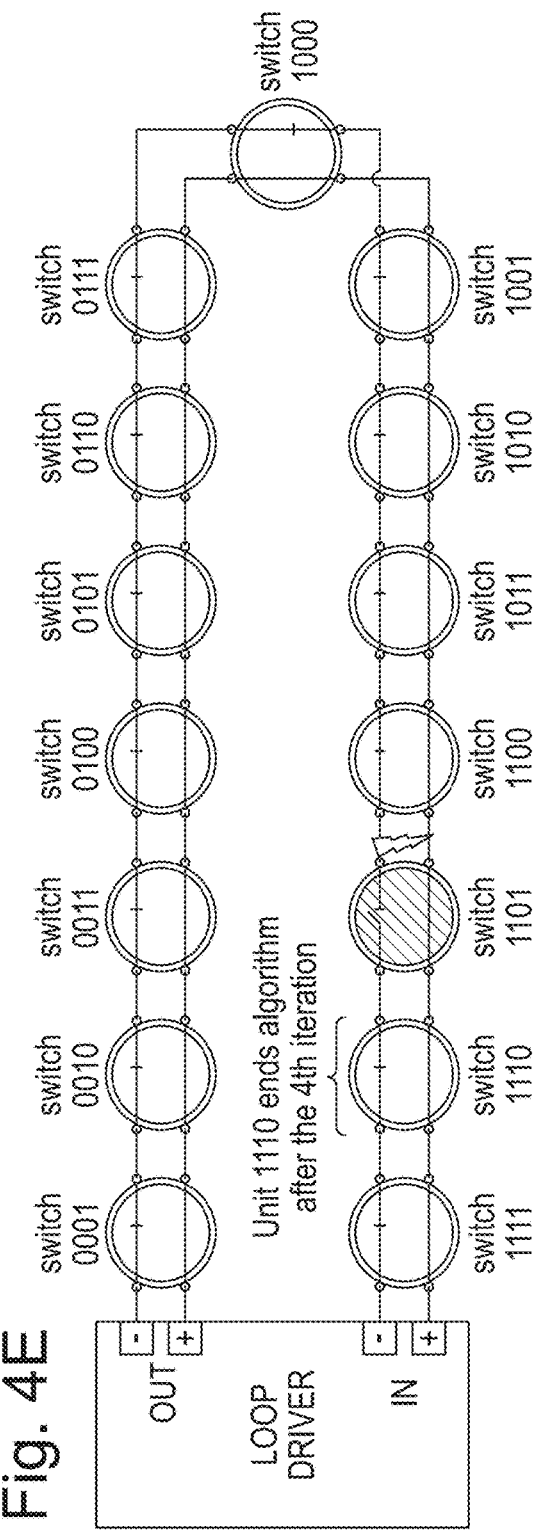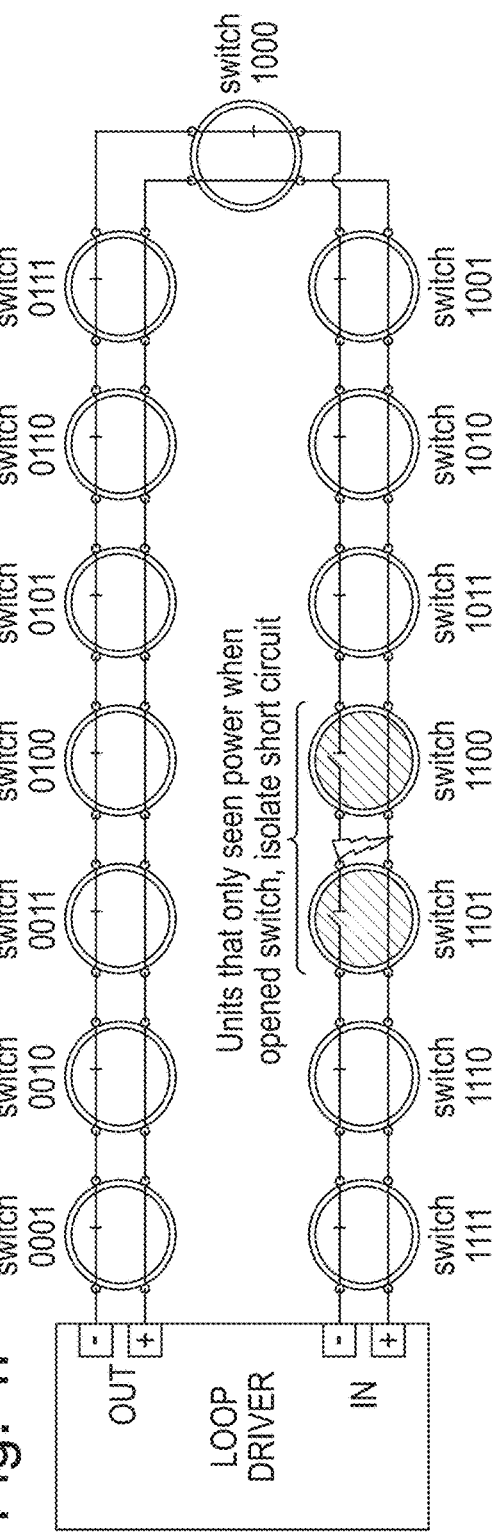

SHORT CIRCUIT ISOLATOR

FOREIGN PRIORITY

This application claims priority to European Patent Application No. 20175921.4 filed May 21, 2020, the entire contents of which is incorporated herein by reference.

TECHNICAL FIELD

The present disclosure relates to a method of locating, and a method of isolating, a short circuit in a system comprising a set of components electrically connected in a loop.

BACKGROUND

Systems such as fire protection systems and intrusion detection systems often comprise a plurality of components electrically connected in a loop configuration, with each component receiving electrical power via the loop. For example, fire protection systems typically comprise a fire control panel and one or more other fire protection components, such as fire detectors (such as smoke and heat sensors), manual call points, fire alarms, and fire suppression systems (such as sprinklers, fire barriers, smoke extractors, etc.). The components of the fire protection system are electrically connected in a loop configuration, with the connecting wiring starting and finishing at the fire control panel.

Such systems may typically be configured such that the loop is divided into a plurality of electrically isolatable segments. This then means that in the event of a short circuit, for example due to an electrical fault, the segment of the loop within which the short circuit is located can be electrically isolated from the other segments of the loop. The other segments of the loop can continue to receive power due to the loop configuration, thereby preventing a single electrical fault disabling a large number of the components in the loop system.

The Applicant believes that there remains scope for improvements to such systems.

SUMMARY

Embodiments provide a method of locating a short circuit in a system comprising a set of components electrically connected in a loop and having a set of locations within the loop in which a short circuit could be located, the method comprising: determining in which location of the set of locations a short circuit is located by performing multiple iterations, each iteration comprising: (i) dividing a set of remaining locations in which the short circuit could be located into two subsets; (ii) determining in which of the two subsets the short circuit is located; and (iii) eliminating, from the set of remaining locations, the subset other than the subset in which the short circuit is determined to be located.

Correspondingly, each iteration may comprise retaining in the set of remaining locations only the subset in which the short circuit is determined to be located.

Various embodiments relate to determining the location of a short circuit in a system comprising one or more, such as a plurality of, components electrically connected together in a loop configuration, such as a fire protection system or an intrusion detection system. The system comprises a set of plural locations in which a short circuit could be located, where each location may correspond to an electrically isolatable segment of a set of electrically isolatable segments of the loop.

In various embodiments, a time-synchronized opening and closing sequence of one or more isolator switches of the components is performed, such that at the end of the sequence, one or two isolator switches isolate the short circuit in the loop. Embodiments will be described generally with reference to a binary search algorithm, but other search algorithms could be used.

In various embodiments, the loop is initially divided into (exactly) two subsets of possible locations (with each possible location being in one of the two subsets), and it is determined which of the two subsets the short circuit is located within. The subset within which the short circuit is not (determined to be) located is then eliminated, whereas the subset within which the short circuit is (determined to be) located may be retained and further subdivided into (exactly) two further subsets (with each remaining possible location being in one of the two further subsets), and it may be determined which of these two further subsets the short circuit is located within. In various embodiments, this recursive subdivision process continues until the short circuit is determined to be located within, for example, a single electrically isolatable segment of the loop. The, e.g., electrically isolatable segment of the loop within which the short circuit is finally determined to be located may then be isolated from the rest of the loop.

The inventor has recognized that it is possible to determine the location of a short circuit in a loop system according to a method that is analogous to a "binary search algorithm". This accordingly means that the time taken to determine the location of a short circuit can be greatly decreased, e.g. as compared to conventional "linear" methods in which the location of a short circuit may be determined, for example, by checking each electrically isolatable segment of the loop in turn. Correspondingly, various embodiments can greatly decrease the time taken to isolate a short circuit, and accordingly reduce the time take to recover from a short circuit. Moreover, and as will be discussed below, embodiments allow a short circuit to be isolated without the need for external, e.g. control panel, logic. Moreover, a short circuit may be isolated without the need to remove power supplied to the loop, thus avoiding the need for loop components to restart following a loss of power, for example. This may be of particular importance in safety critical systems, such as fire protection systems and intrusion detection systems.

Moreover, as will be discussed further below, various embodiments provide a short circuit isolator that can, for example, correctly operate on a loop with low impedance, since its short circuit detection criteria may not be based on voltage drop across units of the loop. Moreover, a short circuit isolator according to various embodiments may correctly operate on a digital bus, e.g. where a communications protocol may drive loop voltage to zero volts, e.g. in contrast with a system in which zero volts is interpreted as an active short circuit state.

It will be appreciated, therefore, that the present disclosure provides an improved method of locating a short circuit in a loop.

The set of remaining locations will change from one iteration to the next. In the first (initial) iteration of the multiple iterations, the set of remaining locations may correspond to (may be the same as) the (complete) set of locations within the loop.

In each iteration following the first (initial) iteration, the set of remaining locations may include fewer locations than the (complete) set of locations within the loop. In each iteration following the first (initial) iteration, the set of remaining locations may include fewer locations than were in the set of remaining locations of the previous iteration.

The method may comprise iterating (performing iterations) until a final iteration, such that after the final iteration has been performed, all locations except the (single) location in which the short circuit is located have been eliminated. Thus, the method may comprise iterating (performing iterations) until only the location in which the short circuit is located remains from the set of remaining locations.

The two subsets (at each iteration) may comprise a first subset of n location(s) and a second subset of m location(s), wherein m and n are equal (m=n) or wherein a difference between m and n is equal to one (|m−n|=1). Each of m and n may be a positive integer. The subsets will change from one iteration to the next.

The (complete) set of locations within the loop may comprise $2^x$ locations, where x is a positive integer which may be greater than 1.

The method may comprise electrically isolating the location (within loop) in which the short circuit is determined to be located (from the other locations of the set of locations).

Embodiments may accordingly provide a method of isolating a short circuit comprising isolating a short circuit located using the method of locating a short circuit as described herein.

The system may comprise a set of short circuit isolator circuits that divides the loop into a set of electrically isolatable segments, and each location of the set of locations may be (a location of) an electrically isolatable segment of the set of electrically isolatable segments.

Each of one or more or all components of the set of components may comprise, or may be, a short circuit isolator circuit of the set of short circuit isolator circuits.

A (each) short circuit isolator circuit may comprise an isolator switch.

An (each) isolator switch may be operable to interrupt electrical communication along the loop.

Determining in which of the two subsets the short circuit is located may be performed by:

pulsing an isolator switch of a selected short circuit isolator circuit of the set of short circuit isolator circuits, wherein the selected short circuit isolator circuit divides (i.e. is selected so as to divide) the set of remaining locations into the two subsets; and determining that the short circuit is located in the subset of the two subsets for which (each) short circuit isolator circuit(s) (corresponding to that subset) detect conditions indicative of a short circuit when the isolator switch of the selected short circuit isolator circuit is pulsed.

Correspondingly, it may be determined that the short circuit is not located in (is other than located in) the subset of the two subsets for which (each) short circuit isolator circuit(s) (corresponding to that subset) do not detect (other than detect) conditions indicative of a short circuit when the isolator switch of the selected short circuit isolator circuit is pulsed (or detect conditions indicative of the absence of a short circuit when the isolator switch of the selected short circuit isolator circuit is pulsed).

The method may comprise a short circuit isolator circuit (such as each short circuit isolator circuit that corresponds to the set of remaining locations except the selected short circuit isolator) (of the set of short circuit isolator circuits): attempting to detect conditions indicative of a short circuit; and determining that a next iteration should be performed only when conditions indicative of a short circuit are detected.

The method may comprise the short circuit isolator circuit performing a next iteration (only) when it is determined that a next iteration should be performed. The method may comprise the short circuit isolator circuit not performing a next iteration (other than performing a next iteration) when the conditions indicative of a short circuit are not detected by the short circuit isolator circuit (or when conditions indicative of an absence of a short circuit are detected by the short circuit isolator circuit). The method may comprise, when it is determined not to perform (when it is determined to other than perform) a next iteration, maintaining the respective isolator switch closed (in iteration(s) of the multiple iterations) thereafter.

The indicative conditions may be based on a voltage, and/or current and/or resistance. For example, a short circuit may be indicated by a voltage being, or remaining, below a threshold voltage. Conversely, an absence of a short circuit may be indicated by a voltage being greater than (or equal to) the threshold voltage.

The method may comprise (a (each) short circuit isolator circuit) beginning a (the) first (initial) iteration in response to (the short circuit isolator circuit) detecting conditions indicative of a short circuit.

These indicative conditions may be based on a voltage, and/or current and/or resistance. For example, a short circuit may be indicated by a voltage being, or dropping, below a threshold voltage (for a threshold time). Conversely, an absence of a short circuit may be indicated by a voltage being greater than (or equal to) the threshold voltage.

The method may comprise determining whether an (each) isolator switch should pulse during an (each) iteration; and the isolator switch pulsing during that iteration when it is determined that the isolator switch should pulse during that iteration. In other words, the method may comprise determining which iteration, if any, an (each) isolator switch should pulse during, and the isolator switch pulsing during the determined iteration, if any.

The isolator switch may pulse from closed, to open, and back to closed.

It may be determined whether an isolator switch should pulse during an (each) iteration based on a unique reference assigned to the respective short circuit isolator circuit.

The method may comprise assigning a unique reference to each short circuit isolator circuit in the set of short circuit isolator circuits.

A (each) unique reference may be assigned to a short circuit isolator circuit based on the position of the short circuit isolator circuit in the loop.

The unique reference may comprise a binary number.

The method may comprise determining whether a (each) short circuit isolator circuit has completed a maximum number of iterations; and when it is determined that the short circuit isolator circuit has completed the maximum number of iterations, opening the respective isolator switch (in order to isolate a short circuit).

The maximum number of iterations may be determined based on (the length of) the unique reference.

The method may comprise (each short circuit isolator circuit) performing each iteration for the same, predetermined iteration time. The method may comprise different short circuit isolator circuits performing iterations in synchronisation with each other.

The system may comprise a power supply (loop driver) configured to supply electrical power to (each component of) the set of components via the loop. The system may comprise a control panel. The power supply (loop driver) may be controlled by and/or part of the control panel.

The short circuit may be located (and isolated) independently of (not under the control of) the power supply (loop driver) and/or control panel. Each iteration may be performed (by a short circuit isolator circuit) independently of the power supply (loop driver) and/or control panel. For example, a (each) short circuit isolator may begin the first (and each subsequent) iteration independently of the power supply (loop driver) and/or control panel.

The method may comprise locating (and isolating) the short circuit without the power supply (loop driver) and/or control panel removing electrical power supplied to the loop. The power supply (loop driver) and/or control panel may be configured to, in response to a short circuit, remove electrical power supplied to the loop after a reset time has elapsed. The method may comprise locating (and isolating) the short circuit in a shorter time than the reset time.

The system may be a fire protection system. Each component may accordingly be a fire protection component such as a fire detector, smoke detector, heat detector, manual call point, fire alarm, fire suppression component, sprinkler, fire barrier, smoke extractor, and the like, or a (dedicated) short circuit isolator.

The system may be an intrusion detection system. Each component may accordingly be an intrusion detection component such as a motion sensor, contact sensor, and the like, or a (dedicated) short circuit isolator.

Other systems comprising a set of one or more components electrically connected in a loop would be possible. The loop may comprise, for example, a digital loop or bus.

The loop may comprise a pair of conductors.

A (each) short circuit isolator circuit may comprise a detecting circuit configured to detect (the) conditions indicative of a short circuit (between the pair of conductors).

A (each) short circuit isolator circuit may comprise a controller circuit configured to, for each of one or more iterations: determine whether conditions indicative of a short circuit are detected by the detecting circuit during that iteration; and determine, based on whether conditions indicative of a short circuit are detected by the detecting circuit during that iteration, whether to perform another (a next) iteration.

Embodiments also provide a short circuit isolator (circuit) for electrically isolating a short circuit between a pair of conductors of a circuit (wiring) having a loop configuration, the short circuit isolator (circuit) comprising: a detecting circuit configured to detect conditions indicative of a short circuit between the pair of conductors; and a controller circuit configured to, for each of one or more iterations: determine whether conditions indicative of a short circuit are detected by the detecting circuit during that iteration; and determine, based on whether conditions indicative of a short circuit are detected by the detecting circuit during that iteration, whether to perform another (a next) iteration.

The controller circuit may be configured to perform another (the next) iteration (only) when it is determined to perform another (the next) iteration. The controller circuit may be configured to, when it is other than (not) determined to perform another iteration, not perform (other than perform) another iteration. The controller circuit may be configured to, when it is other than (not) determined to perform another iteration, maintain the respective isolator switch closed (in iteration(s) of the multiple iterations) thereafter.

The controller circuit may be configured to perform another (the next) iteration (only) when the conditions indicative of a short circuit are detected by the detecting circuit. The controller circuit may be configured to not perform another iteration (to other than perform the next iteration) when the conditions indicative of a short circuit are not detected (are other than detected) by the detecting circuit (or when conditions indicative of an absence of a short circuit are detected by the detecting circuit).

The indicative conditions may be based on a voltage, and/or current and/or resistance. For example, a short circuit may be indicated by a voltage (between the two conductors) being, or remaining, below a threshold voltage. Conversely, an absence of a short circuit may be indicated by a voltage being greater than (or equal to) the threshold voltage.

The controller circuit may be configured to begin a (the) first (initial) iteration in response to the detecting circuit detecting conditions indicative of a short circuit between the pair of conductors.

These indicative conditions may be based on a voltage, and/or current and/or resistance. For example, a short circuit may be indicated by a voltage between the two conductors being, or dropping, below a threshold voltage (for a threshold time). Conversely, an absence of a short circuit may be indicated by a voltage between the two conductors being greater than (or equal to) the threshold voltage.

The short circuit isolator (circuit) may comprise an isolator switch operable to interrupt electrical communication along at least one conductor of the pair of conductors.

The controller circuit may be configured to, for each of one or more iterations: determine whether the isolator switch should pulse during that iteration; and when it is determined that the isolator switch should pulse during that iteration, cause the isolator switch to pulse during that iteration.

The isolator switch may pulse from closed, to open, and back to closed.

The short circuit isolator (circuit) may comprise storage storing a unique reference. The controller circuit may be configured to determine whether the isolator switch should pulse during an iteration (which iteration, if any, the switch should pulse during) based on the unique reference stored in the storage.

The unique reference may be assigned to the short circuit isolator (circuit) based on the position of the short circuit isolator (circuit) in the loop.

The unique reference may comprise a binary number.

The controller circuit may be configured to determine whether it has completed a maximum number of iterations; and when it is determined that it has completed the maximum number of iterations, to open the isolator switch (in order to isolate a short circuit).

The controller circuit may be configured to determine the maximum number of iterations based on the (length of the) unique reference stored in the storage.

The controller circuit may be configured such that each iteration has the same, predetermined iteration time.

The short circuit isolator may be configured to receive electrical power from a power supply (loop driver) via the loop. The power supply (loop driver) may be controlled by and/or part of a control panel.

The power supply may be configured to, in response to a short circuit, remove electrical power supplied to the loop after a reset time has elapsed. The controller may be configured to complete all iterations in a shorter time than the reset time.

The controller circuit may be configured to perform each iteration independently of (not under the control of) the power supply (loop driver) and/or control panel. For example, the controller circuit may be configured to begin the first (and each subsequent) iteration independently of the power supply (loop driver) and/or control panel.

Embodiments also provide a fire protection component comprising a short circuit isolator (circuit) as described herein. The fire protection component may be a fire detector, smoke detector, heat detector, manual call point, fire alarm, fire suppression component, sprinkler, fire barrier, smoke extractor, and the like.

Embodiments also provide an intrusion detection component comprising a short circuit isolator (circuit) as described herein. The intrusion detection component may be a motion sensor, contact sensor, and the like.

Embodiments also provide a system comprising one or more, such as a plurality of, short circuit isolators (circuits) as described herein.

The system may be a fire protection system or an intrusion detection system.

DRAWING DESCRIPTION

Certain embodiments will now be described, by way of example only, with reference to the following drawings, in which.

Figure 5:
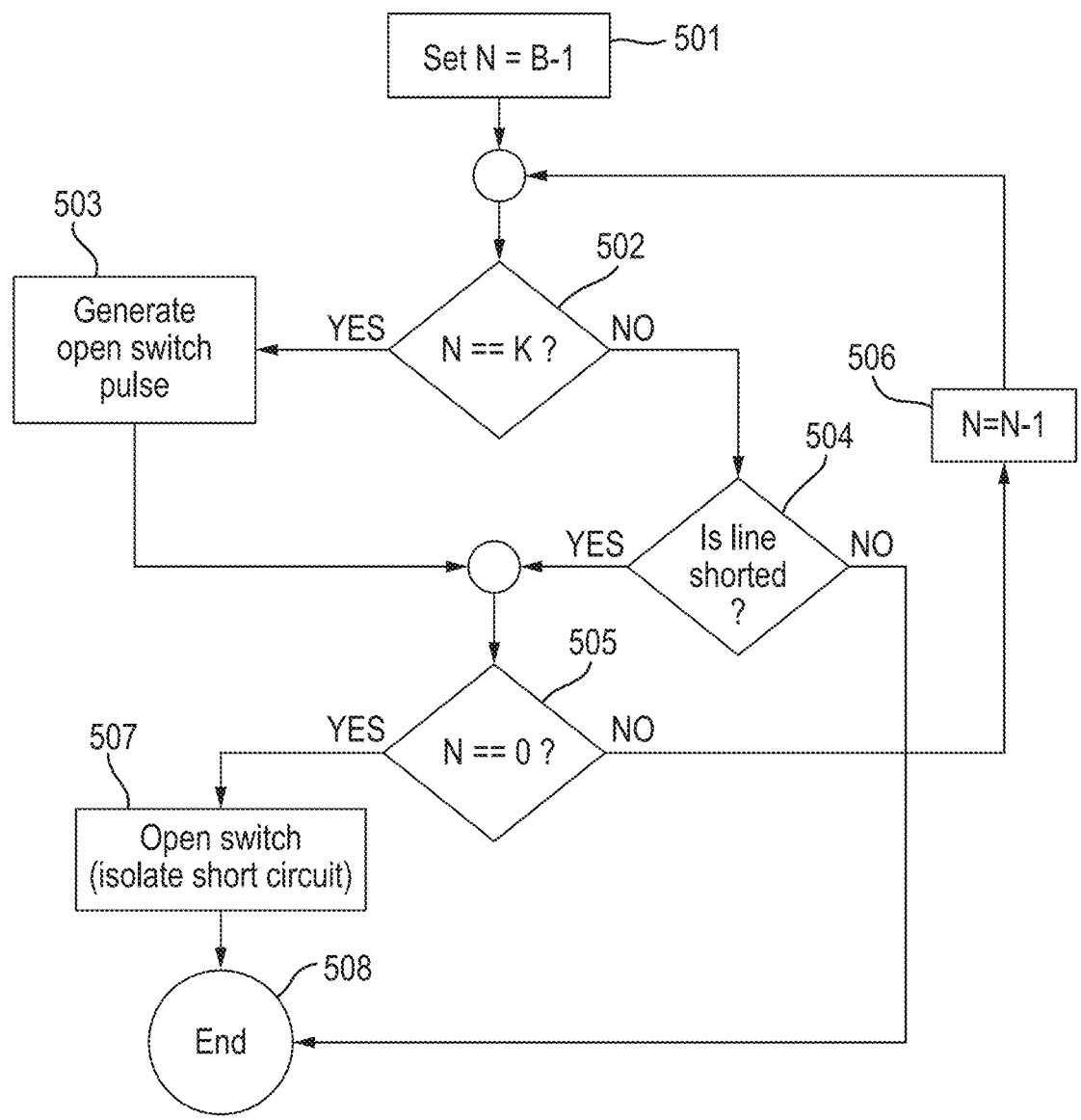

FIGS. 3A-F show an example of an iterative process by which a short circuit is located and isolated according to various embodiments;

FIGS. 4A-F show another example of the iterative process by which a short circuit is located and isolated according to various embodiments;

FIG. 5 is a flow chart illustrating a method of operating a (programmable) short circuit isolator according to various embodiments; and FIGS. 6A-D show comparisons of timings of an iterative process for isolating a short circuit according to various embodiments with a "linear" process for isolating a short circuit.

DETAILED DESCRIPTION

Figure 1:
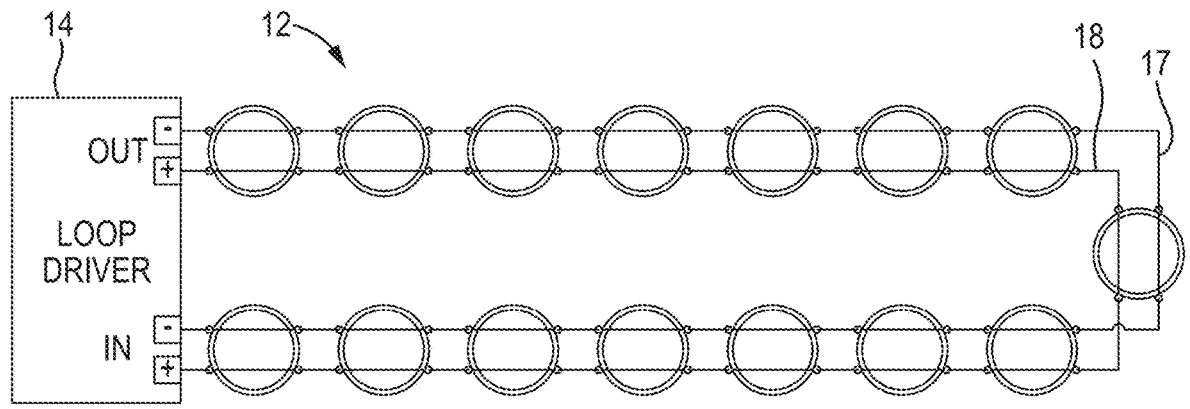
FIG. 1 shows schematically a system comprising a power supply and a set of components connected to the power supply in a loop configuration according to various embodiments.

FIG. 1 shows schematically a system comprising a power supply (loop driver) 14 and a set of components 12 electrically connected in a loop configuration, according to various embodiments. The system may be a fire protection system, and each component in the set of components 12 may accordingly be a fire protection component, such as a fire detector, smoke detector, heat detector, manual call point, fire alarm, fire suppression component, sprinkler, fire barrier, smoke extractor, and the like, or a (dedicated) short circuit isolator. The power supply (loop driver) 14 may be controlled by and/or part of a (fire) control panel.

Although in the embodiment of FIG. 1 the system includes a total of fifteen components connected in a loop configuration, in other embodiments any suitable number of components may be provided in a loop.

Each component of the set of components 12 may be electrically connected to, and receive electrical power from, the power supply (loop driver) 14 by wiring comprising a pair of conductors 17, 18. The conductors 17, 18 may act, for example, as a neutral conductor and a live conductor, respectively. As can be seen in FIG. 1, the wiring may be arranged in a loop configuration, i.e. such that each conductor 17, 18 starts and finishes at the power supply (loop driver) 14. Accordingly, power may be supplied at both ends of the loop wiring by the power supply (loop driver) 14.

In such systems, it is possible that an electrical fault will cause a short circuit, i.e. a low resistance connection between the two conductors 17, 18. To prevent such a fault disabling the entire loop, the loop may be divided into a plurality of electrically isolatable segments, such that a segment of the loop within which a short circuit is located can be electrically isolated from the other segments of the loop. When one segment of the loop is electrically isolated, the other segments of the loop may typically be able to continue to receive power from the power supply 14, due to the loop configuration of the wiring. Accordingly, it is possible that a single short circuit will not disable the entire loop.

The loop may be divided into electrically isolatable segments by one or more short circuit isolator circuits. In various embodiments, each such short circuit isolator circuit is a (programmable) short circuit isolator that is configured to perform an iterative process whereby a short circuit can be located and isolated in particularly fast manner. This will be described in more detail below.

Thus, the system may comprise a power supply 14 and a set of one or more (programmable) short circuit isolator circuits electrically connected to the power supply 14 in a loop configuration. The conductors 17, 18 of adjacent electrically isolatable segments of the loop may be electrically connected via a respective short circuit isolator circuit. A (and each) segment of the loop in between an (and each) adjacent pair of short circuit isolator circuits may accordingly be electrically isolatable. A (and each) segment of the loop in between a short circuit isolator circuit and the power supply 14 may also be electrically isolatable.

Each short circuit isolator circuit may be operable to interrupt electrical communication along at least one conductor of the pair of conductors 17, 18. In the event that a short circuit occurs in an electrically isolatable segment of the loop, an (each) (immediately) adjacent short circuit isolator circuit may interrupt electrical communication along at least one conductor of the pair of conductors 17, 18, in order to electrically isolate the segment of the loop containing the short circuit.

Figure 2:
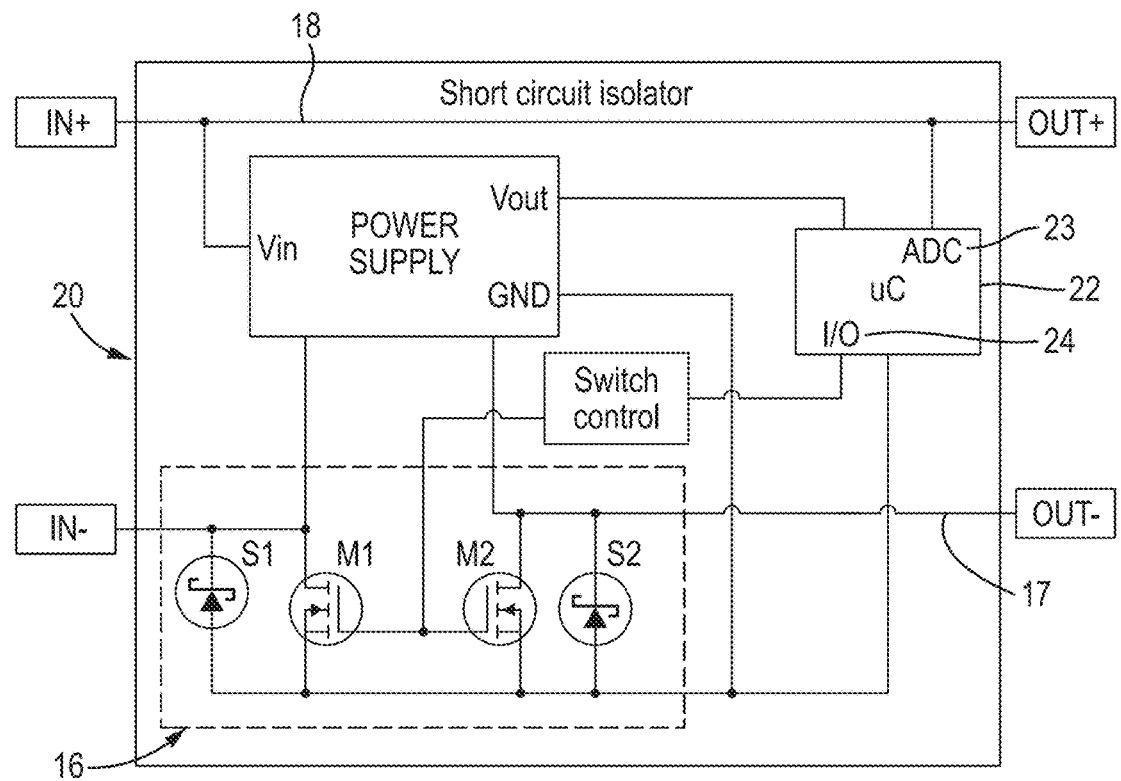
FIG. 2 shows schematically a (programmable) short circuit isolator circuit according to various embodiments.

FIG. 2 schematically illustrates a (programmable) short circuit isolator circuit 20 according to various embodiments. As can be seen in FIG. 2, the (each) short circuit isolator circuit 20 may comprise an isolator switch 16 which, when open, interrupts electrical communication along at least one conductor of the pair of conductors 17, 18. In the embodiment of FIG. 2, the isolator switch 16 can interrupt electrical communication along only the neutral conductor 17, i.e. between "IN−" and "OUT−". Electrical communication along the live conductor 18, i.e. between "IN+" and OUT+", may accordingly be uninterrupted by the short circuit isolator 20. Other arrangements would be possible.

An (each) isolator switch 16 may typically comprise one or more semiconductor switches, such as one or more transistor switches, such as one or more field-effect transistors (FETs), such as one or more metal-oxide-semiconductor field-effect transistors (MOSFETs). A (and each) such semiconductor switch may comprise a source, drain and gate electrode, wherein application of a suitable gate voltage to the gate electrode may cause the semiconductor switch to allow current to flow between the source and drain electrodes.

As shown in FIG. 2, the (each) isolator switch 16 may comprise two MOSFETs M1 and M2. When the gate voltage of M1 and M2 is high, the resistance of both MOSFETs may drop, for example to several milliohms, so as to allow current to flow along the neutral conductor 17 between pins "IN−" and "OUT−". When the gate voltage of M1 and M2 is low, however, the resistance may increase such that electrical communication along the neutral conductor 17 between pins "IN−" and "OUT−" is interrupted.

The (each) short circuit isolator circuit 20 may be powered through current floating over diodes S1 or S2.

As can be seen in FIG. 2, the (each) short circuit isolator circuit 20 may further comprise a controller circuit 22 that is configured to control the respective isolator switch 16 (to interrupt electrical communication). As shown in FIG. 2, the (each) controller 22 may be a microcontroller and may control the isolator switch 16 via a switch control output 24. The switch control output 24 may control the isolator switch 16 by causing an appropriate voltage to be applied the gate electrode(s) of the isolator switch 16.

The (each) controller circuit 22 may control the respective isolator switch 16 in response to a short circuit occurring, in a manner that will be described below. To facilitate this, the (each) controller circuit 22 may be further configured to monitor for conditions that indicate that a short circuit has occurred (and to respond to a short circuit occurring when the conditions that indicate that a short circuit has occurred occur). For example, the (each) controller circuit 22 may be configured to monitor for a change in the voltage between the two conductors 17, 18 that indicates that a short circuit has occurred. As shown in FIG. 2, the controller circuit 22 may monitor the voltage via an ADC input 23.

It would also or instead be possible for the controller circuit 22 to monitor for a change in current and/or resistance that indicates that a short circuit has occurred. Accordingly, a controller circuit 22 may be able to respond to a short circuit occurring in a loop with any impedance, such as from zero ohms.

A change in the voltage between the two conductors 17, 18 that indicates that a short circuit has occurred may comprise the voltage dropping below a predetermined threshold voltage. However, the voltage could fluctuate in normal use, for example as a result of communications between loop components based on a communication protocol that modulates the loop voltage. It may therefore be determined that a short circuit has occurred (only) when conditions indicative of a short circuit persist for a predetermined threshold time. Thus, a change in the voltage between the two conductors 17, 18 that indicates that a short circuit has occurred may comprise the voltage dropping below a predetermined threshold voltage for (at least) a predetermined threshold time. This may reduce or avoid the chance of falsely determining that a short circuit has occurred, for example as a result of normal fluctuations. Moreover, this may enable the system to support a loop communication protocol which modulates the loop voltage, for example across a range from 0V.

The threshold time may be selected appropriately to reduce or avoid the chance of falsely determining that a short circuit has occurred. For example, the threshold time may be selected to be 30 or 40 ms. The threshold time may be user configurable.

To facilitate this operation, the (each) controller circuit 22 may be configured to detect when the monitored voltage drops below a (the) predetermined threshold voltage, and in response to detecting that the monitored voltage has dropped below the predetermined threshold voltage, begin measuring the time during which the voltage remains below the predetermined threshold voltage. The (each) controller circuit 22 may then respond to a short circuit occurring when the measured time becomes greater than the predetermined threshold time.

To facilitate time measurement, the (each) controller 22 may comprise a suitable timing circuit, for example comprising an oscillator circuit, and may be configured to measure a time using the timing (oscillator) circuit.

When the conditions that indicate that a short circuit has occurred occur, the controller 22 may respond by (immediately) beginning a process for determining the location of, and isolating, the short circuit. In various embodiments, this process comprises an iterative process, i.e. comprising one or more iterations. Thus, the (each) short circuit isolator circuit 20 may be configured to perform an iterative process for determining the location of, and isolating, a short circuit.

Other arrangements for a (programmable) short circuit isolator circuit 20 would be possible.

FIG. 3 illustrates an example of a short circuit 19 being located and isolated using an iterative process according to various embodiments.

In the example illustrated in FIG. 3, each component of the set of components 12 comprises (or is) a respective (programmable) short circuit isolator circuit 20 (comprising an isolator switch 16) that is configured to perform an iterative process as described herein. However, the loop may include one or more other components that do not include (or are not) such a (programmable) short circuit isolator circuit. In this case, such components may be isolatable by the adjacent (programmable) short circuit isolator circuits in the loop. Thus, programmable and non-programmable units can be mixed on the same loop. Moreover, although the example of FIG. 3 includes plural programmable short circuit isolator circuits, in other embodiments a loop may include only one programmable short circuit isolator circuit.

Figure 3A:
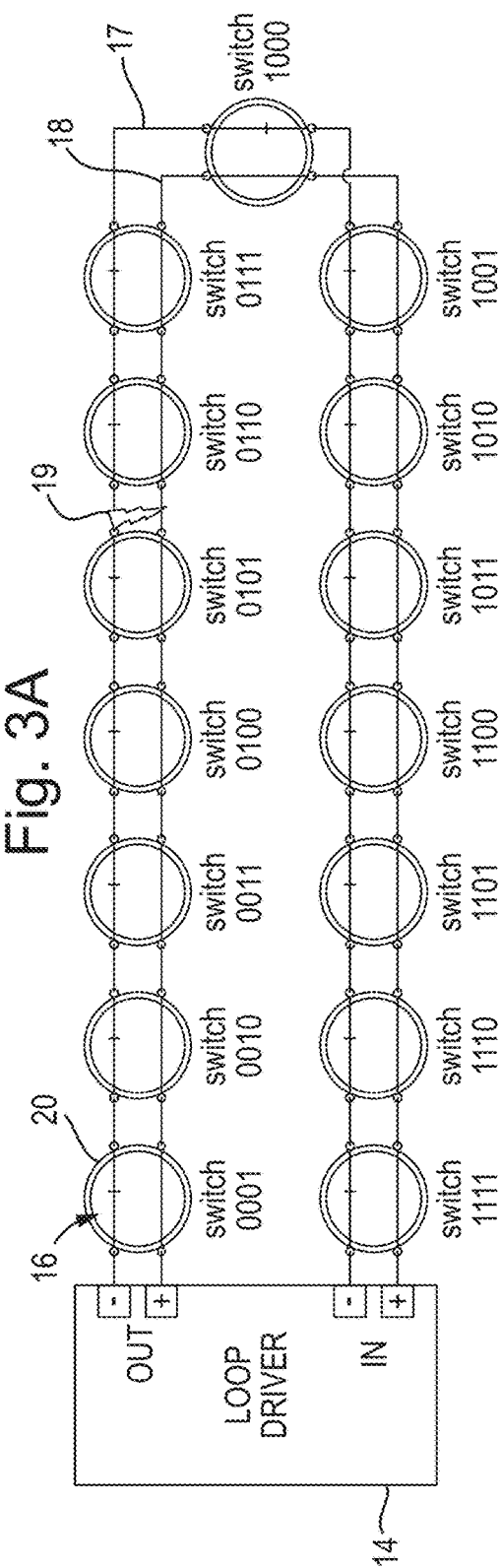

As can be seen in FIG. 3A, and as will be discussed further below, each (programmable) short circuit isolator circuit 20 in the loop may be assigned a unique reference, which may be in the form of a binary address.

As shown in FIG. 3A, in the present example, a short circuit 19 has occurred in the electrically isolatable segment between short circuit isolator circuits "0101" and "0110". As a result of the short circuit 19, the voltage between the two conductors of the loop 17, 18 may drop. Each short circuit isolator circuit 20 in the loop may accordingly recognise that a short circuit has occurred, in the manner as discussed above. As also discussed above, this may then trigger each isolator 20 to operate in order to determine the location of, and isolate, the short circuit 19 using an iterative process.

The iterative process may determine the location of the short circuit 19 by determining the electrically isolatable segment of the loop within which the short circuit 19 is located. This may involve determining the (programmable) isolator circuit(s) 20 that are (immediately) adjacent to the electrically isolatable segment of the loop that contains the short circuit 19. Each so-determined adjacent isolator circuit may then interrupt electrical communication along at least one conductor of the pair of conductors 17, 18, in order to electrically isolate the segment of the loop containing the short circuit 19, for example by opening the respective isolator switch 16.

The iterative process may comprise an iterative "process of elimination". Accordingly, at the start of the first iteration, there may be a set of remaining (i.e. not (yet) eliminated) (programmable) short circuit isolator circuits that includes all of the (programmable) short circuit isolator circuits 20 in the loop (that have recognised that a short circuit has occurred). The short circuit isolator circuits 20 in set of remaining short circuit isolator circuits may effectively divide the loop into a corresponding set of possible electrically isolatable segments that the short circuit 19 could be located in.

Each iteration of the process may then operate to eliminate one or more isolator circuits 20 which are not (immediately) adjacent to the electrically isolatable segment containing the short circuit 19. Thus, at the end of each iteration, the set of remaining short circuit isolator circuits may include fewer short circuit isolator circuits 20 than at the start of the iteration. Correspondingly, at the end of each iteration, the set of possible electrically isolatable segments that the short circuit could be located in may include fewer electrically isolatable segments than at the start of the iteration.

At the end of the final iteration, the set of remaining short circuit isolator circuits may include only the adjacent isolator circuit(s). Correspondingly, at the end of the final iteration, the set of possible electrically isolatable segments that the short circuit could be located in may include only the (single) electrically isolatable segment that the short circuit 19 is located in.

Each iteration may effectively comprise determining on which side of a selected short circuit isolator circuit of the set of remaining short circuit isolator circuits the short circuit 19 is located. Any (not (yet) eliminated) short circuit isolator circuits that are located on the side of the selected short circuit isolator circuit that is determined not to contain the short circuit 19 may be eliminated.

In other words, at each iteration, the loop may be effectively divided by a selected one of the (programmable) short circuit isolator circuits into two portions: a first portion between a first end of the loop wiring and the selected short circuit isolator circuit, and a second portion between the other end of the loop wiring and the selected short circuit isolator. It may then be determined whether the short circuit is located in either the first portion of the loop or in the second portion of the loop. Any short circuit isolator circuits that are located in the portion of the loop determined not to contain the short circuit may be eliminated.

To facilitate this operation, each iteration may comprise the isolator switch 16 of the selected (programmable) short circuit isolator circuit pulsing, for example from closed, to open, and then back to closed, while the isolator switch 16 of each of the other short circuit isolator circuits 20 remains closed. The isolator switch 16 of the selected short circuit isolator circuit may be opened for a predetermined pulse time. For example, the pulse time may be selected to be 1 or 2 ms. The pulse time may be user configurable.

Whilst the isolator switch 16 of the selected short circuit isolator circuit pulses, the controller 22 of each of the other short circuit isolator circuits 20 (in the set of remaining short circuit isolator circuits) may monitor the voltage between the two conductors 17, 18.

When the isolator switch 16 of the selected short circuit isolator circuit opens, the voltage between the two conductors 17, 18 on the side of the switch 16 that does not contain the short circuit 19 should increase, for example to above the predetermined threshold voltage, due to the loop configuration of the wiring. The voltage between the two conductors 17, 18 on the side of the isolator switch 16 of the selected short circuit isolator circuit that does contain the short circuit 19 should, however, remain low, for example below the predetermined threshold voltage, due to the presence of the short circuit 19.

Accordingly, each iteration may comprise, whilst the isolator switch 16 of the selected short circuit isolator circuit pulses, the controller 22 of each of the other short circuit isolator circuits 20 (in the set of remaining short circuit isolator circuits) determining whether the voltage between the two conductors 17, 18 increases above the predetermined threshold value, or remains below the predetermined threshold value. If a controller 22 determines that the voltage remains below the predetermined threshold value, then it may be determined that the respective short circuit isolator circuit 20 is on the side of the loop that contains the short circuit 19, and so that short circuit isolator circuit 20 may be not eliminated at that iteration, and so may perform a next iteration. On the other hand, if a controller 22 determines that the voltage increases above the predetermined threshold value, then it may be determined that the respective short circuit isolator circuit 20 is on the side of the loop that does not contain the short circuit 19, and so that short circuit isolator circuit 20 may be eliminated at that iteration, and so may not perform a next iteration.

It would also or instead be possible for the controller circuit 22 to monitor for a corresponding change in current and/or resistance.

Thus, in various embodiments, the (each) controller 22 is configured to determine whether to perform a next iteration (i.e. whether it is eliminated or not) based on whether conditions indicative of a short circuit were detected during a current iteration.

When a controller 22 determines not to perform a next iteration (when the short circuit isolator circuit is eliminated), the controller 22 may control the respective isolator switch 16 to remain closed thereafter.

The selected (programmable) short circuit isolator circuit (whose isolator switch 16 is pulsed) at any given iteration may be selected so as to minimise the total number of iterations of the process, and therefore maximise the speed with which the location of the short circuit 19 is determined. In particular, the selected short circuit isolator circuit at any given iteration may be the short circuit isolator circuit in the set of remaining short circuit isolator circuits (at the start of the iteration) that evenly divides or approximately evenly divides the corresponding set of possible electrically isolatable segments that the short circuit could be located in into (two) even or approximately even subsets. That is, at (the start of) any given iteration, the number of electrically isolatable segments that the short circuit could be located in on one side of the selected short circuit isolator circuit (i.e. between one end of the loop wiring and the selected short circuit isolator circuit (excluding any already eliminated electrically isolatable segments)) may be equal to the number of electrically isolatable segments that the short circuit could be located in on the other side of the selected short circuit isolator circuit (i.e. between the other end of the loop wiring and the selected short circuit isolator circuit excluding any already eliminated electrically isolatable segments), or may differ by only one.

This means that each (programmable) short circuit isolator circuit may be pulsed during a maximum of one iteration of the iterative process.

Figure 3B:
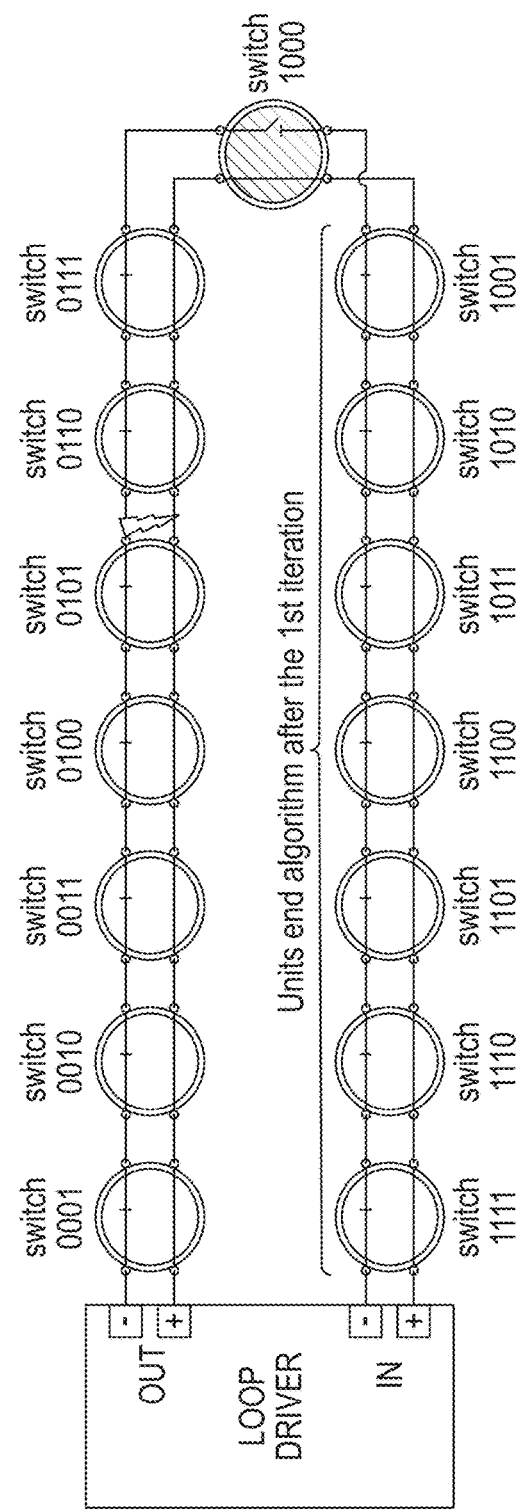

For example, FIG. 3B illustrates the first iteration of the present example. In this example, at the start of the first iteration, the set of remaining short circuit isolator circuits includes all of the fifteen (programmable) short circuit isolator circuits 20 in the loop, and the set of possible electrically isolatable segments that the short circuit 19 could be located within includes all sixteen electrically isolatable segments that the (programmable) isolators 20 divide the loop into. The isolator circuit "1000" evenly divides the set of set of possible electrically isolatable segments, since there are eight possible electrically isolatable segments on either side of isolator circuit "1000" in the loop. The isolator switch 16 of isolator "1000" therefore pulses, while the other isolators monitor the voltage between the two conductors 17, 18.

In this example, when the isolator switch 16 of isolator "1000" pulses, isolators "0001" to "0111" experience no change in voltage due to the short circuit 19 being located on that side of the loop. Isolators "1001" to "1111", however, experience an increase in voltage due to power being received from the power supply 14. Isolators "1001" to "1111" are therefore eliminated at the end of the first iteration, and their respective isolator switches 16 remain in the closed position thereafter.

Figure 3C:
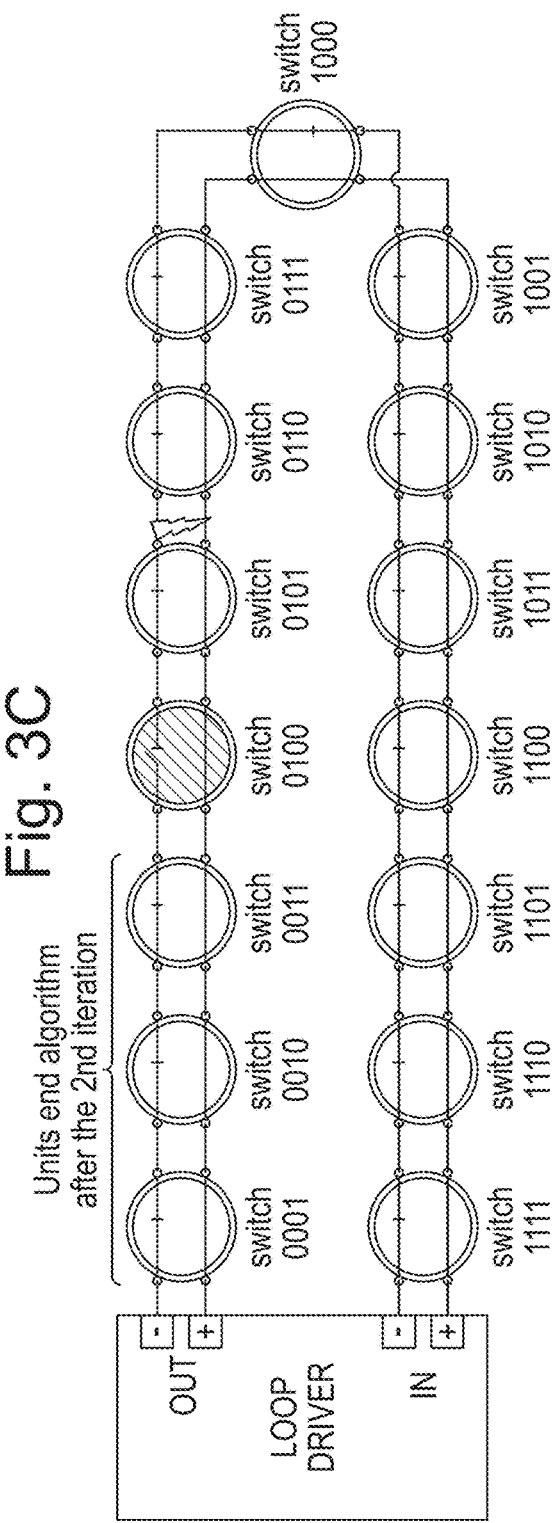

FIG. 3C illustrates the second iteration of the present example. At the start of the second iteration, the set of remaining short circuit isolator circuits includes isolators "0001" to "1000", and there are eight possible electrically isolatable segments therebetween that the short circuit 19 could be located within. The isolator circuit "0100" evenly divides this set of possible electrically isolatable segments, since there are four remaining possible electrically isolatable segments on either side of isolator circuit "0100" in the loop. The isolator switch 16 of isolator "0100" therefore pulses, while the other isolators monitor the voltage between the two conductors 17, 18.

In this example, when the isolator switch 16 of isolator "0100" pulses, isolators "0101" to "1000" experience no change in voltage due to the short circuit 19 being located on that side of the loop. Isolators "0001" to "0011", however, experience an increase in voltage due to power being received from the power supply 14. Isolators "0001" to "0011" are therefore eliminated at the end of the second iteration, and their respective isolator switches 16 remain in the closed position thereafter.

Figure 3D:
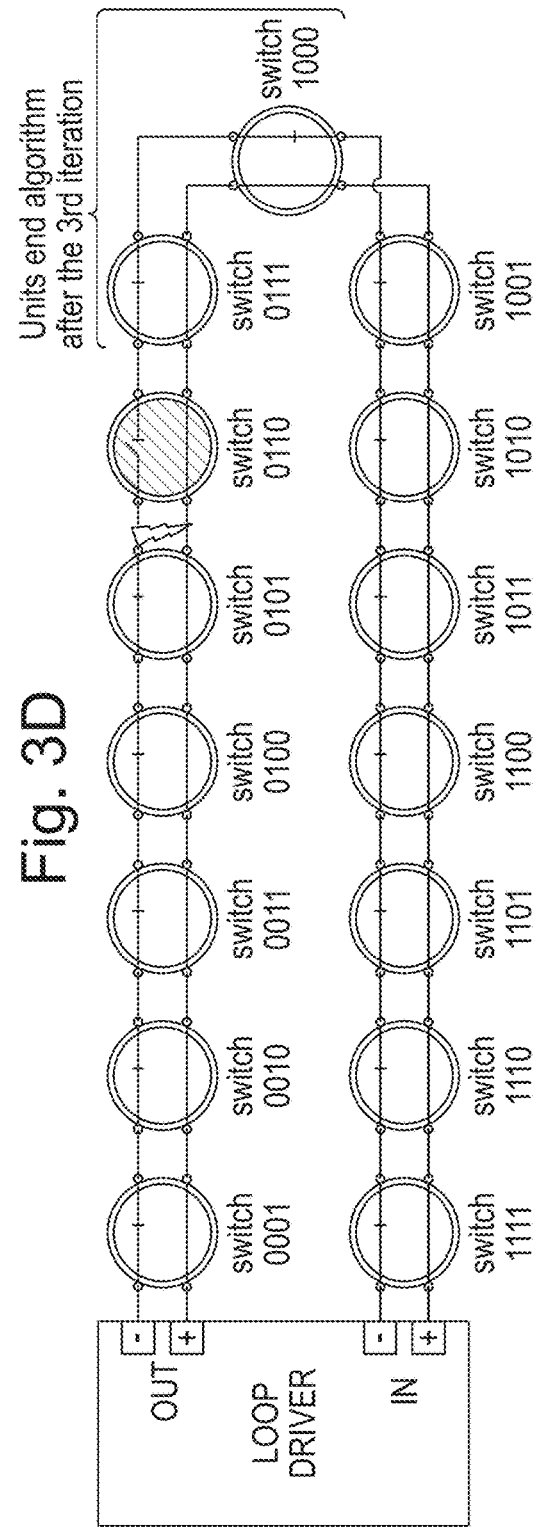

FIG. 3D illustrates the third iteration of the present example. At the start of the third iteration, the set of remaining short circuit isolator circuits includes isolators "0100" to "1000", and there are four possible electrically isolatable segments therebetween that the short circuit 19 could be located within. The isolator circuit "0110" evenly divides this set of possible electrically isolatable segments, since there are two remaining possible electrically isolatable segments on either side of isolator circuit "0110" in the loop. The isolator switch 16 of isolator "0110" therefore pulses, while the other isolators monitor the voltage between the two conductors 17, 18.

In this example, when the isolator switch 16 of isolator "0110" pulses, isolators "0100" and "0101" experience no change in voltage due to the short circuit 19 being located on that side of the loop. Isolators "0111" and "1000", however, experience an increase in voltage due to power being received from the power supply 14. Isolators "0111" and "1000" are therefore eliminated at the end of the third iteration, and their respective isolator switches 16 remain in the closed position thereafter.

FIG. 3E illustrates the fourth and final iteration of the present example. At the start of the fourth iteration, the set of remaining short circuit isolator circuits includes isolators "0100" to "0110", and there are two possible electrically isolatable segments therebetween that the short circuit 19 could be located within. The isolator circuit "0101" evenly divides this set of possible electrically isolatable segments, since there is one remaining possible electrically isolatable segment on either side of isolator circuit "0101" in the loop.

The isolator switch 16 of isolator "0101" therefore pulses, while the other isolators monitor the voltage between the two conductors 17, 18.

In this example, when the isolator switch 16 of isolator "0101" pulses, isolator "0110" experiences no change in voltage due to the short circuit 19 being located on that side of the loop. Isolator "0100", however, experiences an increase in voltage due to power being received from the power supply 14. Isolator "0100" is therefore eliminated at the end of the fourth iteration and its respective isolator switch 16 remains in the closed position thereafter.

FIG. 3F illustrates the final state of the present example. At the end of the fourth and final iteration, only two isolators, "0101" and "0110", and only one possible electrically isolatable segment therebetween, remain. It can therefore be determined that the short circuit 19 is located in the electrically isolatable segment between isolators "0101" and "0110". The isolator switches 16 of isolators "0101" and "0110" are therefore opened in order to isolate the short circuit 19. Isolators "0101" and "0110" may then each report this fact to the (fire) control panel.

FIGS. 4A-F illustrate another example in which a short circuit 19 occurs in between isolators "1101" and "1100". As illustrated in these Figures, the location of the short circuit 19 is again determined in four iterations. In the final state, as illustrated in FIG. 4F, isolator switches 16 of isolators "1101" and "1100" are opened in order to isolate the short circuit 19.

Thus, in various embodiments, a set of possible locations that a short circuit could be located in is recursively subdivided in order to locate the short circuit. At each iteration, it is determined in which of (exactly) two subsets the set of possible locations has been evenly divided into the short circuit is located in, and the subset in which the short circuit is determined not to be located in is discarded. Iterations continue until the set of possible locations includes only the location that the short circuit is located in. In various embodiments, each possible location in the set of possible locations is an electrically isolatable segment of a loop, and the location (electrically isolatable segment) that the short circuit is located in is electrically isolated.

To facilitate particularly efficient operation, the loop may be divided into a power of two number of electrically isolatable segments, such as 4, 8, 16, 32, 64, or 128 segments. Correspondingly, there may conveniently be 3, 7, 15, 31, 63, or 127 (programmable) isolators in the loop. However, other numbers of electrically isolatable segments and isolators would be possible.

It will be appreciated that the above described iterative process may be analogous to a "binary search algorithm". Accordingly, the number of iterations required to determine the location of, and isolate, a short circuit may be of the order $\text{Log}_2(n)$, where n is the number of electrically isolatable segments in the loop. This means that the time taken to determine the location of, and isolate, a short circuit may be greatly reduced, e.g. as compared to "linear" methods in which the location of a short circuit may be determined, for example, by checking each electrically isolatable segment of the loop in turn, such that the number of steps may be of the order n.

In particular, the inventor has found that a short circuit can be located and isolated in a particularly short time, such as tens of milliseconds. This is much shorter than typical "linear" methods, which can often take several minutes in order to locate and isolate a short circuit. Moreover, a short circuit can be isolated without the need to reset the loop driver 14 or control panel. Accordingly, loss of component functionality may be reduced or entirely avoided.

It would be possible for the above iterative process to be performed under the control of, for example the loop driver 14 or control panel. However, the inventor has recognized that this may introduce additional signaling and/or logic requirements, which may reduce the overall speed with which a short circuit can be located and isolated, and increase loop driver or control panel complexity. Each (programmable) short circuit isolator circuit 20 may therefore be configured to be independently triggered to operate as discussed above, i.e. without the involvement of the loop driver 14 or control panel. This can allow faster short circuit isolation, and simplify loop driver 14 and/or control panel logic requirements.

To facilitate this, each short circuit isolator circuit 20 (controller 22) may be configured to begin the first iteration at the time that the controller 22 recognises that a short circuit has occurred (for example, at the time at which the measured time becomes greater than the predetermined threshold time, as discussed above).

Furthermore, each short circuit isolator circuit 20 (controller 22) may be configured to perform each iteration for the same, predetermined iteration time. For example, the iteration time may be selected to be 1, 2 or 4 ms. The iteration time may be user configurable.

Accordingly, since each controller on the same loop should have experienced the voltage dropping below the predetermined threshold voltage at the same time, each controller should recognise that a short circuit has occurred at the same time, and so begin the iterative process at the same time, and using the same iteration time. Different (programmable) isolators (controllers) on the same loop should accordingly perform iterations of the iterative process in synchronisation with each other, without the involvement of, for example, the loop driver 14 or control panel.

Additionally or alternatively, each short circuit isolator circuit 20 may be configured to be able to perform the iterative process without receiving electrical power from the loop driver 14, for example for at least a time period of about 300 ms. Each short circuit isolator circuit 20 may accordingly comprise local power storage for storing and providing suitable electrical power locally. Since, as discussed above, in various embodiments described herein, a short circuit can be isolated in several milliseconds, this may accordingly mean that component functionality is never lost.

Additionally or alternatively, each short circuit isolator circuit 20 may be configured to be able to communicate to the loop driver or control panel the fact that is has been determined that the short circuit isolator circuit 20 is adjacent to a short circuit (and its isolator switch 16 is open).

Additionally or alternatively, as already mentioned, each (programmable) short circuit isolator circuit 20 may be assigned a unique reference, which may be in the form of a binary address. Each (programmable) short circuit isolator circuit 20 (controller 22) may then be configured to determine how to operate in any given iteration based on the unique reference, e.g. binary address, assigned to the isolator 20. Accordingly, each isolator 20 may be able to determine how to operate in each iteration of the iterative process without the involvement of, for example, the loop driver 14 or control panel.

In particular, each isolator 20 may be configured to determine for each iteration, whether the respective isolator switch 16 should pulse based on its unique reference. Additionally or alternatively, each isolator 20 may be configured to determine a maximum number of iterations to perform based on its unique reference.

Each (programmable) short circuit isolator circuit 20 may accordingly comprise storage for storing the respective reference, e.g. binary address. The stored reference, e.g. binary address, may be user modifiable.

For example, FIG. 5 is a flow chart illustrating a process by which a (each) controller 22 may determine how to operate in each iteration of an iterative process based on its unique binary address, in accordance with various embodiments.

As shown in FIG. 5, the process begins at step 501, with the controller 22 beginning the first iteration by setting the iteration counter N to be equal to B−1, where B is the number of bits in the binary address. For example, in the examples of FIG. 3, each binary address has 4 bits, and so N is initially set to 3.

At step 502, the controller 22 determines whether the current value of N is equal to K, where K is the bit position of the least significant (rightmost) set bit in the binary address of the controller 22 (and where the bit position of the least significant (rightmost) bit in the binary address is 0, the bit position of the next least significant bit in the binary address is 1, and so on). For example, in the example of FIG. 3, K is equal to 3 for controller "1000", and K is equal to 2 for controllers "0100" and "1100".

If the controller 22 determines that the current value of N is equal to K, then at step 503, the controller 22 controls the respective isolator switch 16 to pulse during the current iteration.

If, however, the controller 22 determines that the current value of N is not equal to K, then at step 504, the respective isolator switch 16 remains closed, and the controller 22 monitors for conditions indicative of a short circuit (for example, no change in voltage) during the current iteration.

If the controller 22 does not detect conditions indicative of a short circuit during the current iteration at step 504 (for example, if a change in voltage is detected), then at step 508, the controller 22 is eliminated, and does not participate in any subsequent iterations.

If the controller 22 does detect conditions indicative of a short circuit during the current iteration at step 504, or if the controller 22 has controlled the respective isolator switch 16 to pulse during the current iteration at step 503, then the controller 22 is not eliminated, and at step 505 the controller 22 checks whether it should perform another iteration by determining whether the current value of N is equal to zero.

If the current value of N is not equal to zero, then at step 506 the controller 22 begins the next iteration by decreasing the value of N by 1. The controller 22 then determines again whether the current value of N is equal to K at step 502, and so on.

If at step 505, the current value of N is equal to zero, then that signifies that the controller 22 has completed the maximum number of iterations without being eliminated. The controller 22 therefore opens the respective isolator switch 16 at step 507 in order to isolate the short circuit.

This will have the effect that only one isolator switch 16 is pulsed during each iteration. For example, in the example of FIG. 3, at the first iteration N will only be equal to K for controller "1000". Accordingly, only controller "1000" will pulse during the first iteration. In the second iteration, N will be equal to K for controllers "0100" and "1100". However, controller "1100" will have been eliminated in the first iteration and so will not participate in the second iteration, such that only controller "0100" will pulse in the second iteration. Moreover, each isolator switch 16 may be pulsed a maximum of once during the entire iterative process.

The binary addresses may be assigned based on the positions of the isolators 20 in the loop. In particular, the binary addresses may be assigned such that at each iteration only the isolator switch 16 of the isolator 20 selected as discussed above pulses.

Figure 6A:
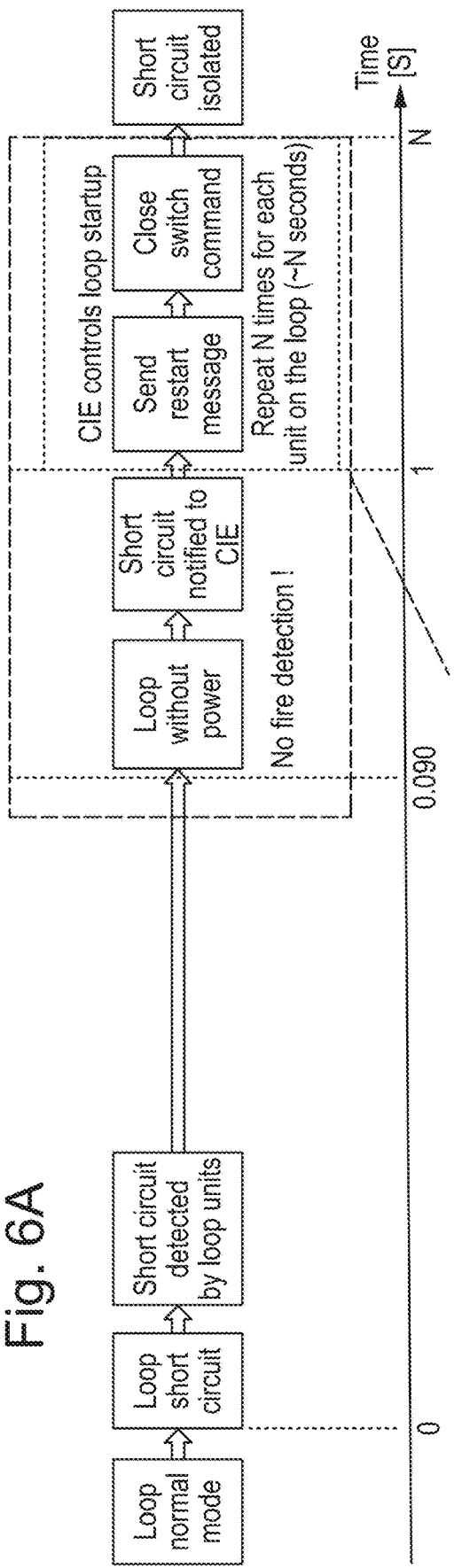
Figure 6B:
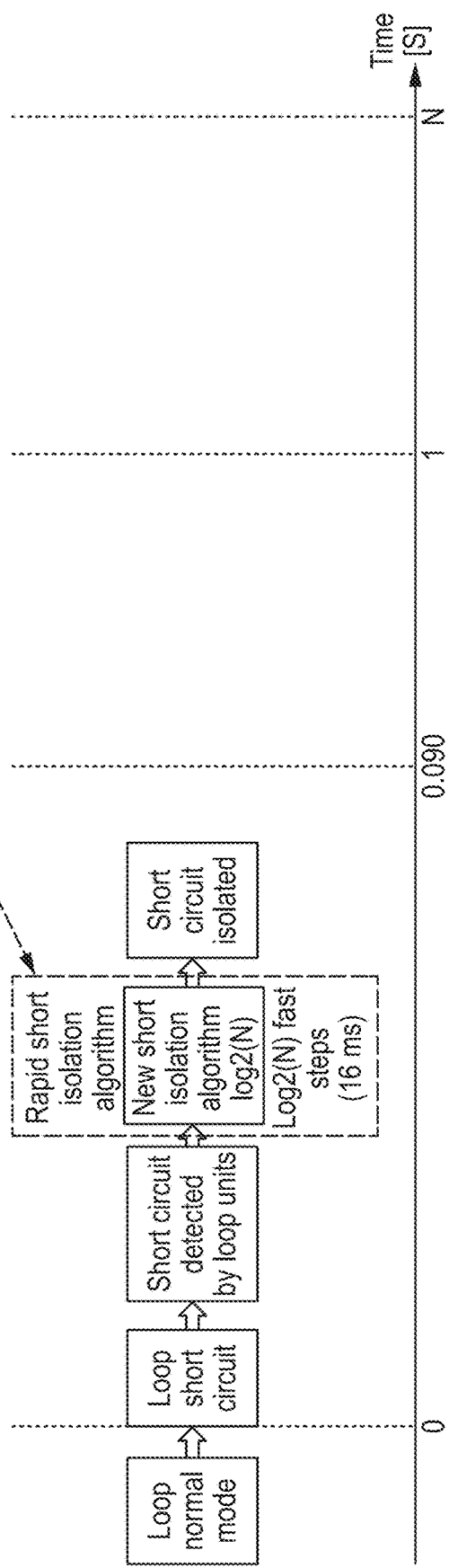
Figure 6C:
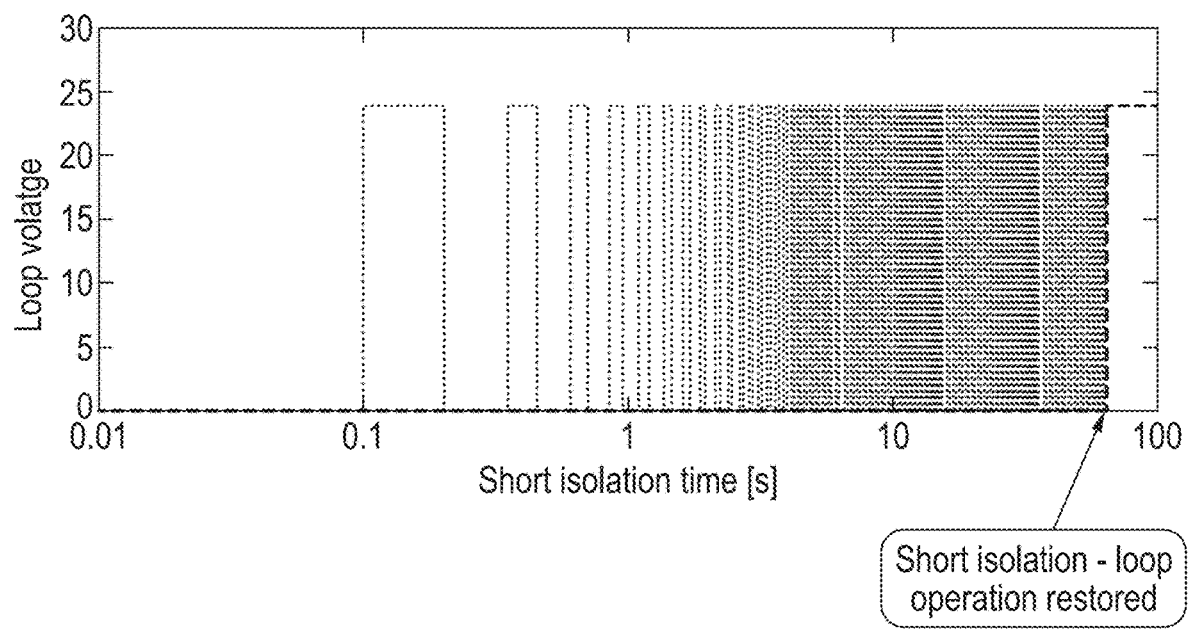
Figure 6D:
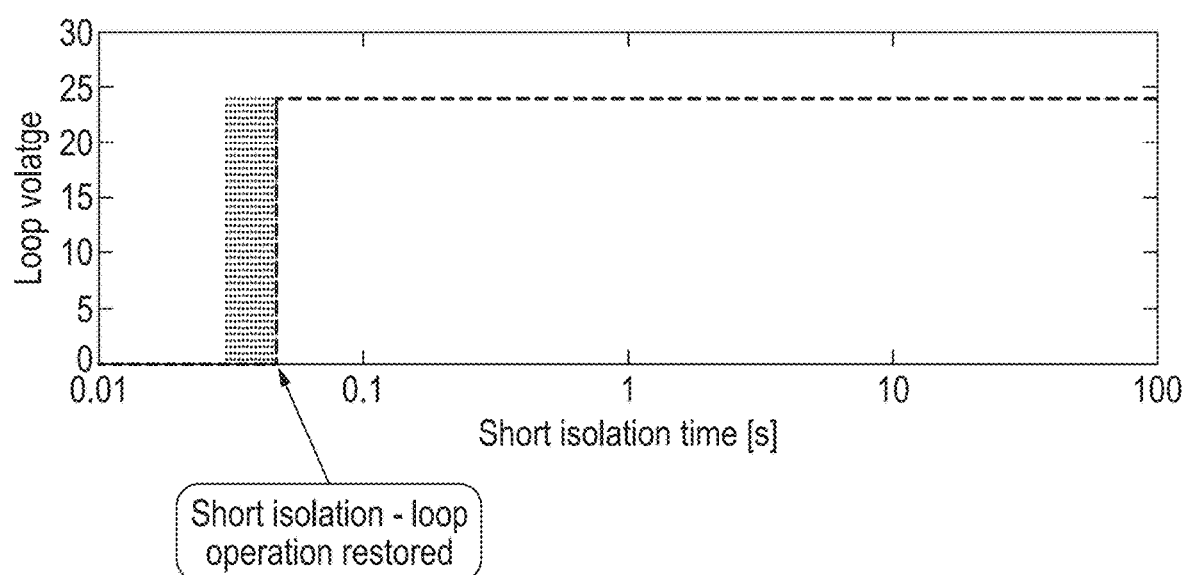

FIGS. 6A-D show a comparison of an iterative process for isolating a short circuit according to various embodiments with a conventional "linear" process for isolating a short circuit. In particular, FIG. 6A schematically illustrates a "linear" process in which, in response to a short circuit occurring, a fire control panel (CIE) controls each component on the loop to restart in turn. As shown in FIG. 6C, in this case, the overall time taken to restore operation following a short circuit may be several tens of seconds, during which components on the loop may lose fire detection capabilities. FIGS. 6B and 6D are the equivalent diagrams for an iterative process according to various embodiments. As can be seen in these Figures, in this case the overall time taken to restore operation following a short circuit may be several tens of milliseconds, i.e. much shorter. Moreover, loss of fire detection capabilities may be avoided. In particular, a short circuit may be located and isolated before power would normally be removed from the loop by the loop controller, thus avoiding the need for loop components to restart following a power off event, and to then perform a potentially time consuming process for reconnection with the fire control panel (CIE).

Although the above has been described with reference to isolating a single short circuit occurring in a loop, embodiments can operate to isolate multiple different short circuits, which may occur in multiple different locations in the loop.

Although the above has been described with particular reference to a fire protection system, other detector systems comprising detector components connected to a power supply in a loop configuration are contemplated. For example, the system may be an intrusion detection system, in which case the set of components 12 may comprise a set of intrusion detection components, such as motion sensors, contact sensors, and the like.

Although the above has been described with particular reference to detector systems, other systems would be possible. For example, one or more short circuit isolators according to embodiments described herein may be used for short circuit isolation in a digital loop or bus.

What is claimed is:

1. A short circuit isolator for electrically isolating a short circuit between a pair of conductors of a circuit having a loop configuration, the short circuit isolator comprising:

an isolator switch operable to interrupt electrical communication along at least one conductor of the pair of conductors;
a detecting circuit configured to detect conditions indicative of the short circuit between the pair of conductors; and
a controller circuit configured to perform one or more iterations, wherein each iteration of the one or more iterations comprises the controller circuit:
    causing the isolator switch to pulse during the respective iteration, or
    determining whether conditions indicative of the short circuit are detected by the detecting circuit during the respective iteration; and
    determining whether to perform another iteration.

2. The short circuit isolator of claim 1, wherein the controller circuit is configured to begin a first iteration in response to the detecting circuit detecting conditions indicative of the short circuit between the pair of conductors.

3. The short circuit isolator of claim 1,
wherein the controller circuit is configured to determine to not perform another iteration when conditions indicative of a short circuit are not detected by the detecting circuit.

4. The short circuit isolator of claim 1, further comprising a storage configured to store a unique reference;
wherein the controller circuit is configured to determine whether the isolator switch should pulse during an iteration based on the unique reference stored in the storage.

5. The short circuit isolator of claim 1, wherein the controller circuit is configured to:
determine whether it has completed a maximum number of iterations; and
when it is determined that it has completed the maximum number of iterations, open the isolator switch.

6. The short circuit isolator of claim 1, wherein the controller circuit is configured such that each of the one or more iterations has the same predetermined iteration time.

7. A fire protection component or intrusion detection component comprising a short circuit isolator as claimed in claim 1.

8. A system comprising a one or more short circuit isolators as claimed in claim 1.

9. The system of claim 8, wherein the system is a fire protection system, an intrusion detection system or other system.

* * * * *